(12) United States Patent
Liebenow

(10) Patent No.: US 6,957,445 B1
(45) Date of Patent: Oct. 18, 2005

(54) METHOD, SYSTEM, SOFTWARE, AND SIGNAL FOR PERFORMING EVENTS FOR RELATED PROGRAMS

(75) Inventor: Frank Liebenow, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/334,185

(22) Filed: Jun. 16, 1999

(51) Int. Cl.[7] .............................................. G06F 3/00
(52) U.S. Cl. ............................ 725/40; 725/44; 725/47; 725/52
(58) Field of Search ................................ 348/563, 564; 725/39, 45, 92, 93, 94, 115, 116, 40, 44, 47, 725/50

(56) References Cited

U.S. PATENT DOCUMENTS

| | | | |
|---|---|---|---|
| 4,115,846 A | 9/1978 | Laine | 364/200 |
| 4,697,209 A | 9/1987 | Kiewit et al. | 358/84 |
| 4,706,121 A | 11/1987 | Young | 358/142 |
| 5,151,789 A | 9/1992 | Young | 358/194.1 |
| 4,706,121 A | 12/1993 | Young | 358/142 |
| 5,353,121 A | 10/1994 | Young et al. | 348/563 |
| 5,532,754 A | 7/1996 | Young et al. | 348/569 |
| 5,550,576 A | 8/1996 | Klosterman | 348/6 |
| 5,559,548 A | 9/1996 | Davis et al. | 348/6 |
| 5,585,865 A * | 12/1996 | Amano et al. | 725/14 |
| 5,589,892 A * | 12/1996 | Knee et al. | 348/731 |
| 5,594,509 A * | 1/1997 | Florin et al. | 348/731 |
| 5,629,733 A | 5/1997 | Youman et al. | 348/7 |
| 5,635,978 A | 6/1997 | Alten et al. | 348/7 |
| 5,675,390 A * | 10/1997 | Schindler et al. | 348/552 |
| 5,686,954 A | 11/1997 | Yoshinobu et al. | 348/13 |
| 5,699,107 A | 12/1997 | Lawler et al. | 348/13 |
| 5,732,338 A | 3/1998 | Schwob | 455/158.5 |
| 5,751,282 A | 5/1998 | Girard et al. | 345/327 |
| 5,751,372 A | 5/1998 | Forson | 348/569 |
| 5,758,257 A | 5/1998 | Herz et al. | 455/2 |
| 5,760,821 A | 6/1998 | Ellis et al. | 348/10 |
| 5,798,785 A * | 8/1998 | Hendricks et al. | 725/53 |
| 5,801,753 A | 9/1998 | Eyer et al. | 348/13 |
| 5,801,787 A | 9/1998 | Schein et al. | 348/569 |
| 5,805,204 A | 9/1998 | Thompson et al. | 348/13 |
| 5,805,235 A | 9/1998 | Bedard | 348/569 |
| 5,822,123 A * | 10/1998 | Davis et al. | 348/564 |
| 6,025,837 A * | 2/2000 | Matthews, III et al. | 345/327 |
| 6,133,909 A * | 10/2000 | Schein et al. | 725/53 |
| 6,163,316 A * | 12/2000 | Killian | 725/53 |
| 6,247,176 B1 * | 6/2001 | Schein et al. | 725/43 |
| 6,459,427 B1 * | 10/2002 | Mao et al. | |

FOREIGN PATENT DOCUMENTS

WO  WO 9607270 A1 * 3/1996 .......... H04N 5/445

* cited by examiner

*Primary Examiner*—Kieu-Oanh Bui
(74) *Attorney, Agent, or Firm*—Jeffrey A. Proehl; Leonard & Proehl

(57) ABSTRACT

A method, system, software and signal wherein a subset of program information for related programs is maintained with program information for a given program. The program information for the given program, including the subset of program information for related programs, can be maintained in an electronic program guide (EPG). A system can use the information in the EPG to schedule and perform program events automatically, or information can be provided to users so that the users can manually schedule or perform program events.

19 Claims, 3 Drawing Sheets

METHOD, SYSTEM, SOFTWARE, AND SIGNAL FOR PERFORMING EVENTS FOR RELATED PROGRAMS

FIELD OF THE INVENTION

The present invention relates generally to a method, system, software and signal for maintaining an electronic program guide (EPG) that includes information associated with related programs and more specifically to an EPG that maintains a subset of the program information for related programs with the program information for a given program.

BACKGROUND OF THE INVENTION

To avoid confusion, it will help to keep a few key definitions in mind while considering the remainder of this document. Unless otherwise specified, the term "program information" will be understood to include all forms of information related to programs provided by television, computer, Internet, set-top box or otherwise for viewing including, but not limited to, program scheduling information. Examples of program information include the following: program names, channels, network names, program lengths, episode descriptions, ratings information, Internet information, audio format information, and subtitle information, to name only a few. Another important term is "program scheduling information." The distinction between program information and program scheduling information can be subtle, so for purposes of clarity, unless otherwise specified, the term "program scheduling information" will be understood to be a subset of program information including, but not limited to, channels on which programs are broadcast as well as scheduled broadcast dates and times. Furthermore, it is to be understood that the term "network" is used throughout this disclosure in a broader sense than the usual meaning given to the term "network". In other words, the use of the term network is not limited to broadcasting companies that broadcast to a network of affiliates throughout the country. Rather, the term network is used loosely to describe different programming entities that occupy different channels in a viewing spectrum, regardless of whether these programming entities, for example, broadcast to a network of affiliates or only to a local cable station. Finally, unless otherwise specified, the term "related programs" will be understood to include, but not be limited to, episodes of recurring programs, segments of a multi-part program, programs with similar content, and programs related through an intermediate program. Other examples of related programs will be set forth in the Detailed Description section of this document.

Typical EPGs are used much like printed program schedules; a user looks through program information or scheduling information including a listing of programs and their scheduled start times. However, unlike their printed program schedule counterparts, EPGs include a user interface having user selectable cells for selecting programs for viewing. Some EPGs also provide users the ability to search for items based on themes such as Western movies or basketball. What most EPGs lack, however, is a means for identifying related programs without specific input from a user. For example, a user may be able to identify all basketball games airing on a certain day by selecting a theme, but current EPGs will not notify a user that a biography of a favorite player is airing immediately after a game the user has scheduled for recording.

Examples of prior art describing EPGs are U.S. Pat. Nos. 4,706,121; B1 4,706,121 (Reexamination of U.S. Pat. No. 4,706,121); 5,353,121; 5,532,754; 5,151,789 and 5,550,576, all of which patents are incorporated herein by reference.

If an EPG maintained a subset of the program information for related programs with the program information of a given program, users would only need to identify one program of interest, and the system could either notify them of related programs or perform another action such as recording related programs, based on the information contained in the EPG.

What is needed is a method, system, software and signal for maintaining a subset of the program information for related programs with the program information of a given program and using this information to schedule program events.

SUMMARY OF THE INVENTION

Accordingly, the present invention provides a method comprising the actions of maintaining a subset of program information for at least one related program of a given program with program information for the given program, and performing at least one program event for the given program, and based upon the subset of program information, the at least one related program.

The present invention also provides a system comprising at least one processor, memory operably associated with the processor, and a program of instructions configured to be executed by the processor and stored in the memory. The program of instructions includes instructions configured to maintain a subset of program information for at least one related program of a given program with program information for the given program, and perform at least one program event for the given program, and based upon the subset of program information, the at least one related program.

In addition, the present invention provides a computer-readable medium tangibly embodying a program of instructions that implements maintaining a subset of program information for at least one related program of a given program with program information for the given program, and performing at least one program event for the given program, and based upon the subset of program information, the at least one related program.

The present invention further provides a signal embodied in a propagation medium comprising at least one instruction configured to maintain a subset of program information for at least one related program of a given program with program information for the given program, and at least one instruction configured to perform at least one program event for the given program, and based upon the subset of program information, the at least one related program.

It is an object of the present invention to provide a method, system, signal, and software for scheduling program events for programs related to a given program by maintaining a subset of program information for at least one related program with program information for a given program.

It is a further object of the present invention to maintain an EPG that maintains a subset of program information for at least one related program with program information for a given program.

An advantage of the present invention is that it allows users to record related programs, even when those programs air on different channels or at irregular intervals.

Another advantage of the present invention is that program information for a given program includes information associated with related programs, thereby allowing programs, of which users may not have been aware, to be brought to the users' attention.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration, specific preferred embodiments in which the invention may be practiced. These embodiments are described in sufficient detail to enable those skilled in the art to practice the invention, and it is to be understood that other embodiments may be utilized, and that logical, mechanical and/or electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
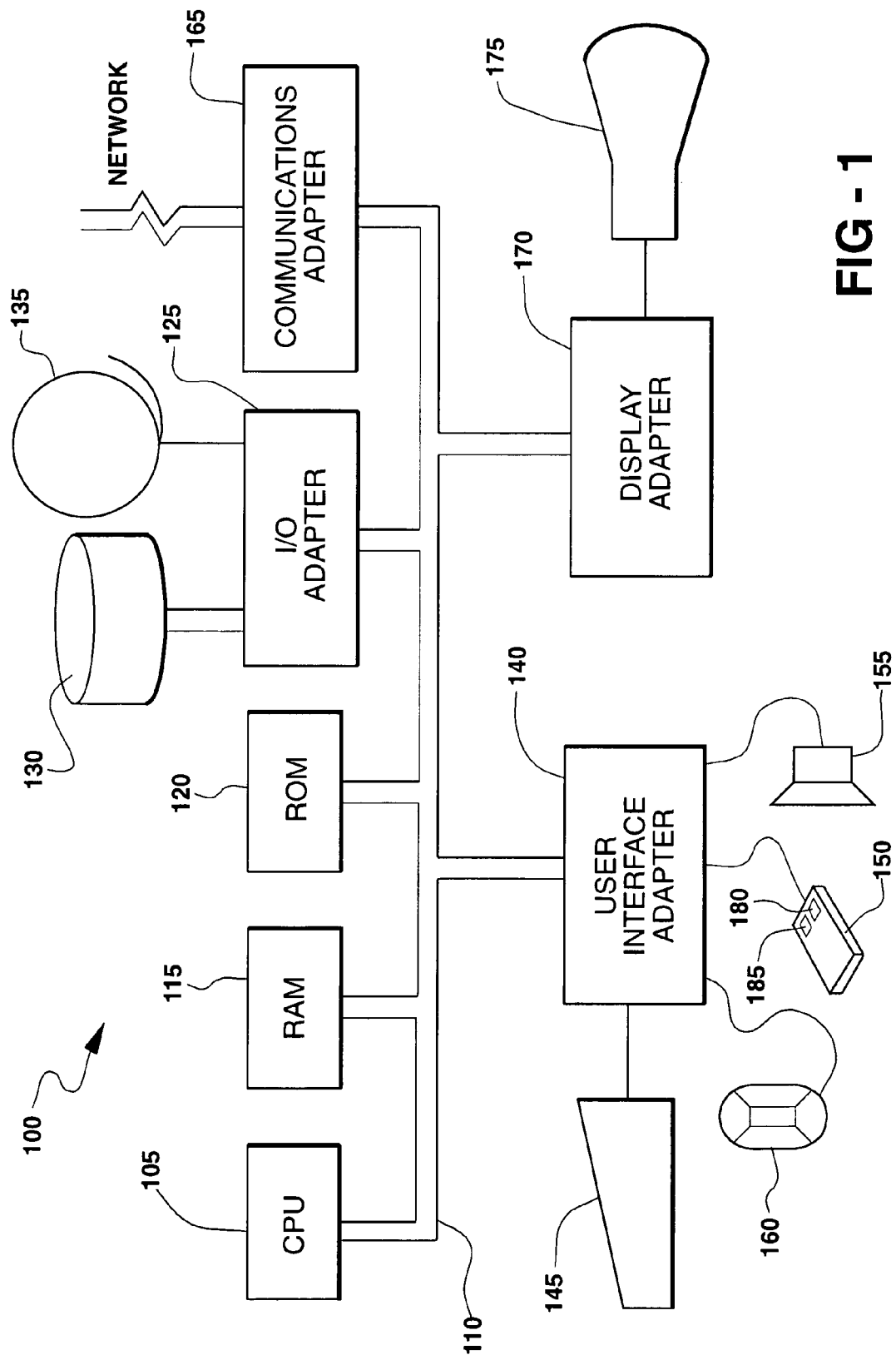
FIG. 1 illustrates a detailed block diagram showing a computer system according to a preferred embodiment of the present invention.

A representative hardware environment for practicing the present invention is depicted in FIG. 1, which illustrates a typical hardware configuration of an information handling system 100 in accordance with the present invention, having a central processing unit (CPU) 105, such as a conventional microprocessor, and a number of other units interconnected via at least one system bus 110. Information handling system 100 may be, for example, a portable or desktop Gateway computer or a Gateway Destination system (Gateway and Destination are trademarks of Gateway 2000, Inc.). Information handling system 100 shown in FIG. 1 includes random access memory (RAM) 115, read-only memory (ROM) 120 (wherein the ROM 120 could also be erasable programmable read-only memory (EPROM) or electrically erasable programmable read-only memory (EEPROM)), and input/output (I/O) adapter 125 for connecting peripheral devices such as disk units 130 and tape drives 135 to system bus 110, a user interface adapter 140 for connecting a keyboard 145, a mouse 150, a speaker 155, a microphone 160 (and/or other user interface devices to system bus 110), a communications adapter 165 for connecting information handling system 100 to an information network such as the Internet, and display adapter 170 for connecting system bus 110 to a display device such as monitor 175. The mouse 150 typically has a first button and a second button, 180 and 185 respectively, and is used to control a cursor (not shown) displayed on the monitor 175.

Figure 2:
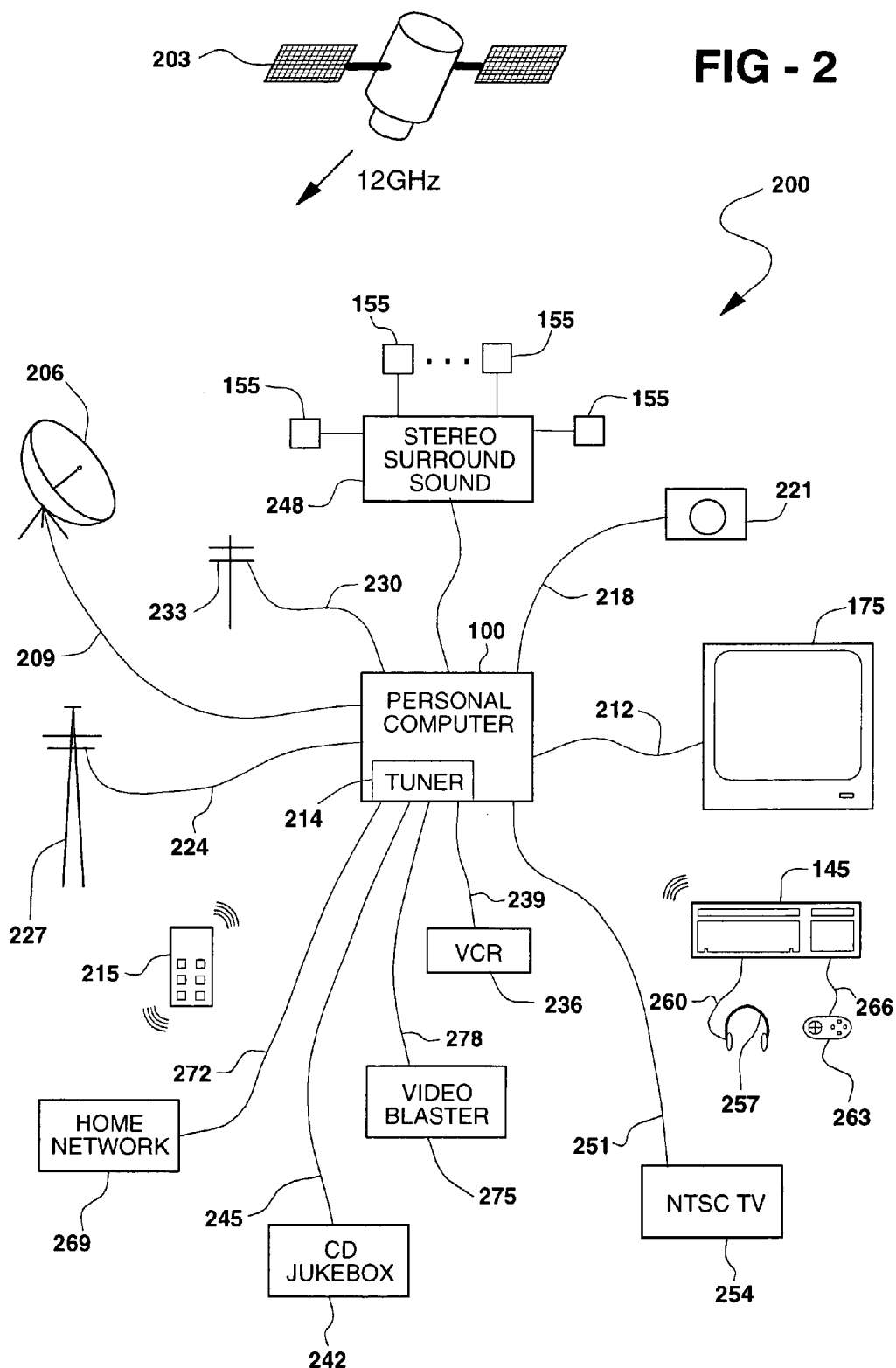
FIG. 2 illustrates a detailed block diagram showing a convergence system according to the preferred embodiment of the present invention.

Referring next to FIG. 2, a system 200 is shown in general detail. Reference numerals or letters in FIG. 2 which are like, similar, or identical to the reference numerals or letters of FIG. 1 indicate like, similar, or identical components or features. External to system 200 is satellite 203 which, in one preferred embodiment, is a HS601 model operated by Hughes at a 101 degree west longitude geosynchronous orbital location. Satellite 203 transmits signals comprising 150 channels of modulated digital video, audio, and data at a frequency of about 12 Ghz. The satellite signals are received by system 200 by antenna 206 containing a low noise block converter amplifier. Antenna 206 is preferably about 18 inches in diameter and receives left- and right-hand circularly polarized signals between 12.2 and 12.7 Ghz. Antenna 206 provides a "down converted-spectrum" signal between 950 and 1450 MHz via a coaxial cable or other suitable communication medium 209 to information handling system 100, such as a personal computer or other system or circuitry capable of processing data. Suitable antennas 206 are already being manufactured and sold by RCA corporation by direct sales and through numerous major retail chains such as Radio Shack.

System 100 contains circuitry and software to further process signals from the antenna, generally demodulating and decoding the signal to produce a VGA (video graphics adapter) signal. The VGA signal is provided via standard VGA compatible monitor cable 212 to drive large screen data quality monitor 175 suitable for viewing in a family room or entertainment room environment. System 100 provides for user input by means of remote controls 215 and 145. Remote control 215 comprises a hand-held size device with standard television controls and a numeric keypad and, in one embodiment, video cassette recorder (VCR) controls and a pointing device. It provides radio frequency (RF) or infrared (IR) control signals received by system 100. Remote control 145 is a full function personal computer keyboard with additional standard television and VCR controls, a pointing device which is preferably in the form of a touchpad, and it also provides RF control signals to system 100. RF control signals were selected over IR or hardwired in one embodiment due to its performance in a home entertainment environment. Monitor cable 212 is a standard type cable typically used on VGA display devices and comprises up to 15 electrical conductors interfacing with monitor 175 in a D-series shell connector. In one embodiment, full multimedia sourcing and destinationing of audio/video/data (A/V/D) broadcast are provided for. Although the embodiment presented herein discusses the use of VGA signals, it should be mentioned that with an appropriate change in hardware, National Television Standard Committee (NTSC) compliant signals and NTSC compliant hardware will employ the present invention in the manner mentioned herein.

Information handling system 100 may include a tuner, tuner circuitry 214, or card capable of both tuning to multiple channels and receiving television information or signals in the form of the NTSC or Phase Alteration Line (PAL) form from any medium carrying signals from satellite dish 206 which provides digital A/V/D signals from such sources as DirecTV or Primestar (DirecTV is a trademark of DirecTV, Inc., and Primestar is a trademark of Primestar Partners, L.P.). In another such embodiment, the signals carried on medium 209 provide analog A/V such as NTSC antenna signals. In another such embodiment, the signal carried on medium 218 from camera 221 provides analog A/V such as NTSC audio/video signals. In further embodiments, the signal carried on medium 224 from cable-data source 227 provides analog and/or digital A/V/D. In further such embodiments, the signal carried on medium 230 from Public Switched Telephone Network (PSTN) 233 provides data or phone signals such as integrated services digital network (ISDN) or plain old telephone system (POTS) signals. In one set of such embodiments, system 100 is programmed to automatically record analog signals, such as television programming, onto recordable media, such as a video tape in VCR 236 coupled to cable 239. In another such set of embodiments, system 100 is programmed to automatically record digital signals, such as digital television programming, Digital Versatile Disk (DVD) programming, or compact disk read-only memory (CD-ROM) type audio, onto recordable media, such as recordable compact disks, in CD/DVD jukebox 242 coupled to cable 245. CD/DVD jukebox 242 also plays CDs, CD-ROMs or DVDs for use elsewhere. In another such embodiment, signals are sent to stereo surround system 248 for audio output to one or more speakers 155, and on cable 251 to TV 254. In one such embodiment, earphones 257 on cable 260 and game pad 263 on cable 266 provide additional input/output through remote control 145. Home network 269 is "smart wiring" used to transmit data and control within the home, coupled by cable 272 to system 100. Videoblaster 275 provides video signal processing on cable/connector 278. Cables-224, 209, 230, 218, 251, 239, 278, 245, and 260 are examples of connections that can be wired coupling or wireless, such as RF or IR.

One example of convergence system 200 is the Destination System using the DestiVu user or media interface manufactured and sold by Gateway 2000, Inc. In this manner, convergence system 200 is a fully functional computer, integrated with a television for providing TV viewing (via broadcast, cable, satellite, VCR, digital disk, or other broadcast media) and personal computing functionality. This convergence of computer and television provides a user with combined access to both television programs and information/computer-related functionality, such as computer information and programs and Internet access.

Although many of today's televisions employ many of the same hardware resources employed by computers, such as information handling system 100, it is contemplated that the present invention may be practiced in other electronic devices or networked electronic devices. For example, with the development of audio/video networking, such as the recently proposed HAVi standard, television sets or other audio/video devices, such as audio/video receivers and VCRs that do not themselves contain such resources, could implement the present invention by using the resources of other devices on a network.

System 100, as detailed in the preceding paragraphs, can be easily configured to practice the method of the present invention, in which program events are scheduled based on a subset of program information for related programs maintained with the program information of a given program. In a preferred embodiment of the present invention, the subset of program information for one or more related programs is appended to program information for a given program in the following manner:

24 bits of binary data (for a channel identifier, which identifies a channel on which a program will air),
32 bits of binary data (for a time of day indicator, which indicates what time of day a program will air),
32 bits of binary data (for a date identifier, which identifies what day a program will air).

In an alternate embodiment, the date identifier information is shortened to 8 bits, thereby indicating the number of days from a specified day that the program will air, rather than the date the program will air. For example, instead of using 32 bits of data to specify a date of Apr. 1, 1999, 8 bits can be used to indicate that the program will air four days from a given date. Other embodiments, particularly those embodiments involving the exact format of the binary data, will be obvious to one skilled in the art.

As mentioned in the Background of the Invention section, unless otherwise specified, the term "related programs" will be understood to include episodes of recurring programs, segments of a multi-part program, programs with similar content, and programs related through an intermediate program. To clarify even further, a few examples are set forth below.

A program may be related to the given program if both programs are episodes of the same recurring program, such as "Seinfeld;" if both programs are segments of a multi-part program, such as the mini-series "Lonesome Dove;" if both programs have similar content, for instance, two Atlanta Braves baseball games; or if the program is related to an intermediate program that is in turn related to the given program. An example of the last type of relationship could be a program that has content about bears' feeding habits, including eating salmon. The bear program could be related to a program about stocking fish, including salmon, which is further related to a program about fishing in artificially stocked rivers. In any of the examples just given, particularly the final example, the present invention is capable of providing information that may otherwise have gone unnoticed by the user.

Figure 3:
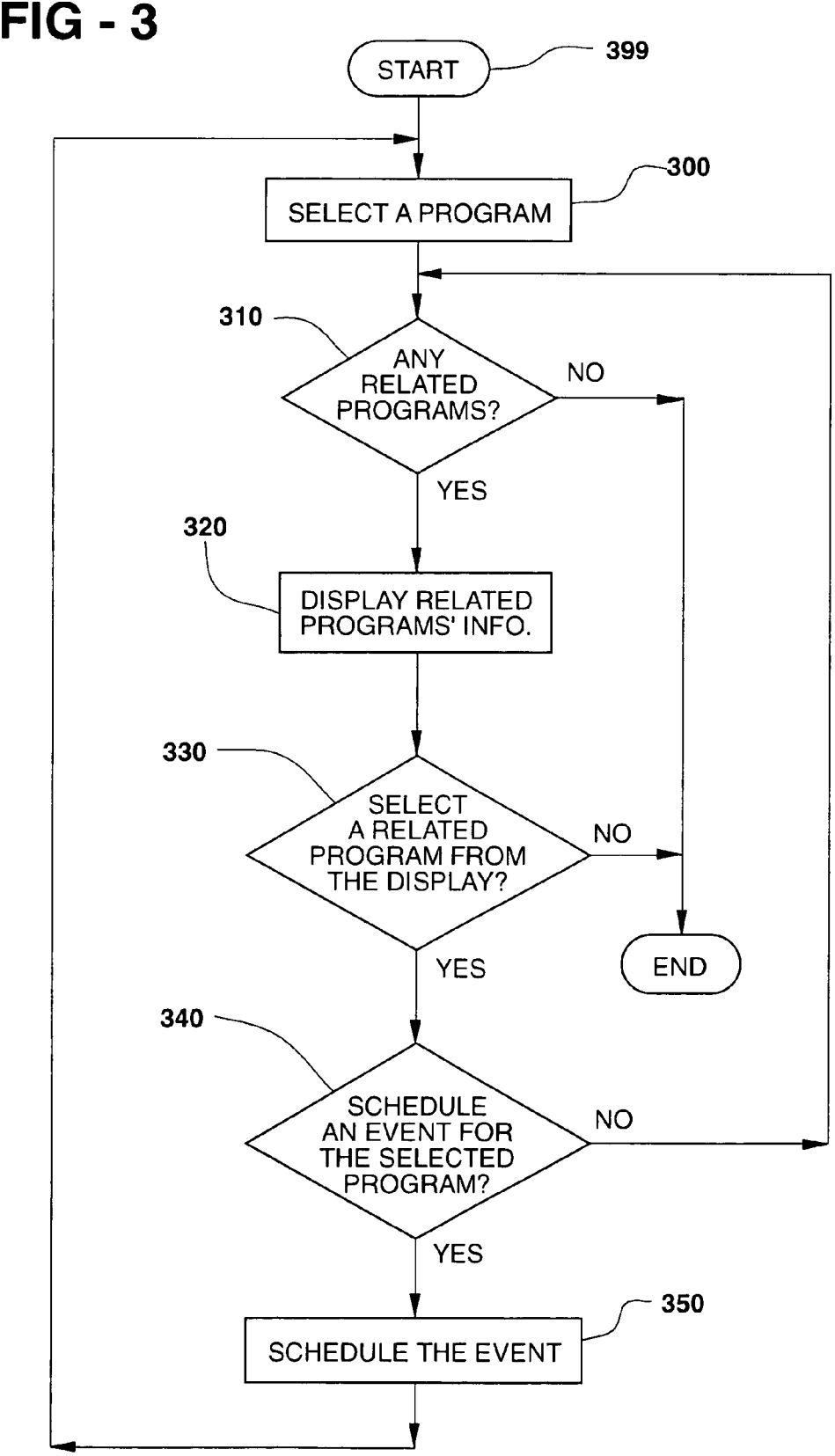
FIG. 3 illustrates a flowchart of a method of scheduling events according to one embodiment of the present invention.

Referring now to FIG. 3, a method according to one embodiment of the present invention will be described. Reference numerals or letters in FIG. 3 which are like, similar, or identical to the referenced numerals or letters of FIGS. 1–2 indicate like, similar, or identical components or features. The method flow chart starts at step 399. In the first step 300, a user selects a program from information provided by an electronic program guide (EPG). Once this is done, step 310 is performed wherein system 100 checks to see if there is any program information for related programs included in the program information for the selected program, thereby determining if there are any related programs. If there are no related programs, the method ends. If there are related programs, the next step 320 in a preferred embodiment of the present invention, is for system 100 to display information associated with related program information, such as titles of related programs. In step 330, a user may then select one or more of the related program titles displayed by step 320. If no selection is desired, the method ends. If a user selects a displayed program, step 340 is performed, and the user is given the option of scheduling a program event. This program event could be a reminder used to display an on-screen notification just prior to a program's scheduled start time, or it could be a command that invokes a record function on VCR 236. Many possible program events exist, including simply causing a program to be immediately displayed. Implementation of these program events can be readily accomplished by those skilled in the art. The next step 350 is to schedule the program event, and the user will have the option to end the process or to select a different related program for consideration. If a user chooses not to schedule the program event in step 340, the present invention returns to step 320 to allow the user to select a different related program. It is understood that this process flow is an illustration of a preferred embodiment of the present invention, and that various steps may be executed in differing order, while still achieving the benefits of the claimed invention.

In a preferred embodiment of the present invention, the program event to be scheduled is a global record function which allows users to record all programs related to a selected program over a period of time selected by a user. For example, suppose a user selects the program "Seinfeld" in step 300. Further suppose that the user schedules a program event that records all programs related to the selected program for the next week. System 100 will automatically identify, by use of a subset of program information for related programs maintained with the program information for the selected program, all related programs (in this case all episodes of Seinfeld) that will air during the user selected period of one week, and schedule recording events for identified programs. The present invention can be employed in a system with multiple recording devices so that if scheduling conflicts or other problems, such as one recording unit running out of tape, occur, recording duties are automatically transferred to another recording device. Implementation of that concept is the basis of another patent application, and is not necessary for the enablement of the claimed invention herein. If unresolvable scheduling conflicts were to occur, the system could simply suppress recording of one program, notify the user, or employ any other commonly known error handling techniques.

One skilled in the art would also notice that in the preferred embodiment of the present invention, all of the related programs could be scheduled for program recording at the same time, as the method above describes, or recording of each related program could be scheduled after the previously scheduled program is recorded.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–4. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, where the transmitted signal could be a signal propagated through a medium such as an ISDN line, or the signal may be propagated through an air medium and received by a local satellite thereupon being transferred to the computer or information handling system of the preferred embodiment where the signal is a composite signal comprising a carrier signal, and contained within the carrier signal is the desired information containing at least one computer program instruction implementing the invention and may be downloaded as such when desired by the user. One skilled in the art would appreciate that the physical storage and/or transfer of the sets of instructions physically changes the medium upon which it is stored electrically, magnetically, or chemically so that the medium carries computer readable information. The invention is limited only by the following claims and their equivalents.

I claim:

1. A method for performing events for related programs, comprising:

maintaining a subset of program information for at least one related program of a given program, the program information for the at least one related program being maintained with program information for the given program in an information handling system;

providing information on programs related to the at least one related program but otherwise unrelated to the given program except through the at least one related program, the information on programs related to the at least one related program being associated with the subset of program information for the at least one related program; and performing at least one program event for the given program and, based upon the subset of program information, the at least one related program.

2. The method of claim 1, further comprising the action of maintaining the program information for the given program, including the subset of program information for the at least one related program, in an electronic program guide (EPG).

3. The method of claim 1, further comprising:

obtaining user input based on the information provided; and performing program events based on the user input.

4. The method of claim 1 wherein the action of performing program events includes recording the given program and the at least one related program.

5. The method of claim 1 wherein the subset of program information is appended to the program information for the given program.

6. A system for performing events for related programs, comprising:

at least one processor;

memory operably associated with said processor; and a program of instructions configured to be executed by said processor and stored in said memory, said program of instructions including instructions configured to maintain a subset of program information for at least one related program of a given program, the program information for the at least one related program being maintained with program information for the given program in an information handling system, provide information on programs related to the at least one related program but otherwise unrelated to the given program except through the at least one related program, the information on programs related to the at least one related program being associated with the subset of program information for the at least one related program, and perform at least one program event for the given program and, based upon the subset of program information, perform at least one program event for the at least one related program and the information on program related through the at least one related program and associated with the subset of program information for the at least one related program.

7. The system of claim 6 wherein said program of instruction further includes instructions configured to maintain the program information for the given program, including the subset of program information for the at least one related program, in an electronic program guide (EPG).

8. The system of claim 6 wherein said program of instructions further includes:
  instructions configured to obtain user input based on the information provided; and
  instruction configured to perform program events based on the user input.

9. The system of claim 6 further comprising a recording device.

10. The system of claim 6 wherein the subset of program information is appended to the program information for the given program.

11. A computer readable medium tangibly embodying a program of instructions implementing the following method:
  maintaining a subset of program information for at least one related program of a given program, the program information for the at least one related program being maintained with program information for the given program in an information handling system;
  providing information on programs related to the at least one related program but otherwise unrelated to the given program except through the at least one related program, the information on programs related to the at least one related program being associated with the subset of program information for the at least one related program; and
  performing at least one program event for the given program and based upon the subset of program information, the at least one related program.

12. The computer readable medium of claim 11 wherein said program of instruction further implements maintaining the program information for the given program, including the subset of program information for the at least one related program, in an electronic program guide (EPG).

13. The computer readable medium of claim 11 wherein said program of instruction further implements:
  obtaining user input based on the information provided; and
  performing program events based on the user input.

14. The computer readable medium of claim 11 wherein said program of instructions further implements recording the given program and the at least one related program.

15. The computer readable medium of claim 11 wherein the subset of program information is appended to the program information for the given program.

16. A signal tangibly embodied in a propagation medium, comprising:
  at least one instruction configured to maintain, in an electronic program guide (EPG), a subset of program information for at least one related program of a given program, the program information for the at least one related program being maintained with program information for the given program;
  at least one instruction configured to provide information on programs related to the at least one related program but otherwise unrelated to the given program except through the at least one related program, the information on programs related to the at least one related program being associated with the subset of program information for the at least one related program; and
  at least one instruction configured to perform at least one program event for the given program and, based upon the subset of program information, the at least one related program.

17. The signal of claim 16 wherein the signal further comprises at least one instruction configured to obtain user input based on the information provided and at least one instruction configured to perform the program events based on user input.

18. The signal of claim 16 wherein the action of performing program events includes recording the given program and the at least one related program.

19. The signal of claim 16 wherein the subset of program information is appended to the program information for the given program.

* * * * *